US006256019B1

(12) United States Patent
Allport

(10) Patent No.: US 6,256,019 B1
(45) Date of Patent: Jul. 3, 2001

(54) METHODS OF USING A CONTROLLER FOR CONTROLLING MULTI-USER ACCESS TO THE FUNCTIONALITY OF CONSUMER DEVICES

(75) Inventor: David E. Allport, Palo Alto, CA (US)

(73) Assignee: eRemote, Inc., Sunnyvale, CA (US)

( * ) Notice: Subject to any disclaimer, the term of this patent is extended or adjusted under 35 U.S.C. 154(b) by 0 days.

(21) Appl. No.: 09/280,524

(22) Filed: Mar. 30, 1999

(51) Int. Cl.$^7$ ........................................... G09G 5/00
(52) U.S. Cl. ................ 345/169; 345/156; 348/734; 283/74; 283/78; 382/124; 382/128
(58) Field of Search ................... 345/156, 168, 345/169, 173; 348/552, 734; 283/67–70, 74–78; 382/115, 124, 128

(56) References Cited

U.S. PATENT DOCUMENTS

| | | | |
|---|---|---|---|
| 4,482,947 | 11/1984 | Zato et al. | 364/138 |
| 4,626,892 | 12/1986 | Nortrup et al. | 358/21 |
| 4,712,105 | 12/1987 | Kohler | 340/825.69 |

(List continued on next page.)

OTHER PUBLICATIONS

Scottsdale Technologies, Inc.'s Manual to Program Master Product, © 1996, 1997.
Rotel of America's User's Manual to Rotel R990 Product (approximately Oct., 1997) .
Page from product brochure of Marantz RC2000 Product, "RC Learning Remote" (approximately Aug. 1996).
Lexicon, Inc.'s product brochure for Lexicon 500T Product, "Take Control. The Lexicon 500T System Controller", © 1994.
Niles Audio Corporation, Inc.'s product brochure, "Intellicontrol Home Theater Automation System", Aug. 1996.
Full House Control Corporation, "The RF Base Station™", © 1997 (pages from website: www.fullhouse.com/base-.html), Apr. 29, 1998.
Full House Control Corporation, "RHOC™ for Windows", © 1997 (pages from website: www.fullhouse.com/rhocwin.html), Apr. 29, 1998.
Kenwood U.S.A., "KC–Z1 Stage 3 Home Theater Controller", (pages from website: www.kewoodusa.com/cat. . . Stage 3 Components/KC–Z1.htm), Apr. 28, 1998.
Sony's Product Promotion Flyer for "Free Keyboard with purchase of the CPD–CX270 and CPD–CX90ES", (approximately Jun., 1997).
Audio Advisor Magazine, "New Pioneer Audiolab CD Players", Nov. 1997, p. 24.
Stereo Review Magazine, "Sony Vision Touch PC Interface and 200–Disc Changer", Sep. 1997, pp. 83–85.
Innovation Device Technologies, Inc. Executive Investment Summary (pages from website: www.innovativedevice-.com/execsum.htm), Apr. 29, 1998.
Aplix Corporation, "Blue Mountain with jblend", (pages from website: www.jBlend.com/products/bm.html), Apr. 29, 1998.
WebTV Networks, "WebTV Backgrounder", (pages from website: www.webtv.net/ns/about/backgrounder.html), May 4, 1998.

Primary Examiner—Bipin Shalwala
Assistant Examiner—Jimmy H. Nguyen
(74) Attorney, Agent, or Firm—Neal M. Cohen

(57) ABSTRACT

Methods are described whereby multiple users can swap a controller of consumer devices between themselves frequently, while each retains the ability to reinstate their own customized controller interface through a quick and simple yet secure log-on procedure. Stored data accessible to the controller is used to automatically upon log-on return a user to a system state associated with that user, which is typically the system state of the controller that existed the last time the user logged on thereto. The log-on procedure may include fingerprint and/or voice recognition. Additionally, time-out algorithms wherein the controller automatically shuts down and/or logs-off the current user as a security measure to prevent unauthorized users from gaining access thereto, may take into account factors other than merely the amount of time that has passed during which there has been no activity.

11 Claims, 1 Drawing Sheet

U.S. PATENT DOCUMENTS

| | | | |
|---|---|---|---|
| 4,746,919 | 5/1988 | Reitmeyer | 340/825.56 |
| 4,856,081 | 8/1989 | Smith | 455/151 |
| 4,872,151 | 10/1989 | Smith | 369/14 |
| 5,005,084 | 4/1991 | Skinner | 358/194 |
| 5,031,046 | 7/1991 | Bruggeman | 358/194.1 |
| 5,038,211 | 8/1991 | Hallenbeck | 358/142 |
| 5,075,771 | 12/1991 | Hashimoto | 358/84 |
| 5,086,385 | 2/1992 | Launey et al. | 364/188 |
| 5,093,718 | 3/1992 | Hoarty et al. | 358/84 |
| 5,146,210 | 9/1992 | Heberle | 340/709 |
| 5,148,159 | 9/1992 | Clark et al. | 340/825 |
| 5,202,929 * | 4/1993 | Lemelson | 382/2 |
| 5,223,924 | 6/1993 | Strubbe | 358/86 |
| 5,228,077 | 7/1993 | Darbee | 379/102 |
| 5,251,034 | 10/1993 | Na | 358/183 |
| 5,315,391 | 5/1994 | Lee | 348/553 |
| 5,315,392 | 5/1994 | Ishikawa et al. | 348/570 |
| 5,343,239 | 8/1994 | Lappington et al. | 348/12 |
| 5,353,121 | 10/1994 | Young et al. | 348/563 |
| 5,379,421 | 1/1995 | Palazzi, III et al. | 395/600 |
| 5,410,326 | 4/1995 | Goldstein | 348/134 |
| 5,422,677 | 6/1995 | Do | 348/568 |
| 5,450,079 | 9/1995 | Dunaway | 341/23 |
| 5,455,570 | 10/1995 | Cook et al. | 340/825.22 |
| 5,465,385 | 11/1995 | Ohga et al. | 455/6.1 |
| 5,479,268 | 12/1995 | Young et al. | 358/335 |
| 5,481,542 | 1/1996 | Logston et al. | 370/94.2 |
| 5,500,691 | 3/1996 | Martin et al. | 348/734 |
| 5,500,794 | 3/1996 | Fujita et al. | 364/188 |
| 5,515,347 | 5/1996 | Mulder et al. | 369/30 |
| 5,537,107 | 7/1996 | Funado | 340/825.72 |
| 5,543,857 | 8/1996 | Wehmeyer et al. | 348/589 |
| 5,545,857 | 8/1996 | Lee et al. | 178/18 |
| 5,548,338 | 8/1996 | Ellis et al. | 348/473 |
| 5,557,338 | 9/1996 | Maze et al. | 348/565 |
| 5,559,504 * | 9/1996 | Itsumi et al. | 340/825.3 |
| 5,561,708 | 10/1996 | Remillard | 379/96 |
| 5,585,866 | 12/1996 | Miller et al. | 348/731 |
| 5,589,892 | 12/1996 | Knee et al. | 348/731 |
| 5,592,551 | 1/1997 | Lett et al. | 380/20 |
| 5,594,509 | 1/1997 | Florin et al. | 348/731 |
| 5,596,373 | 1/1997 | White et al. | 348/569 |
| 5,600,368 | 2/1997 | Mathews, III | 348/143 |
| 5,608,389 | 3/1997 | Matsuzawa | 340/825.57 |
| 5,621,456 | 4/1997 | Florin et al. | 348/7 |
| 5,629,733 | 5/1997 | Youman et al. | 348/7 |
| 5,630,119 | 5/1997 | Aristides et al. | 395/601 |
| 5,630,757 | 5/1997 | Gagin et al. | 463/43 |
| 5,644,727 | 7/1997 | Atkins | 395/240 |
| 5,648,760 | 7/1997 | Kumar | 340/825.25 |
| 5,648,824 | 7/1997 | Dunn et al. | 348/734 |
| 5,652,613 | 7/1997 | Lazarus et al. | 348/7 |
| 5,657,072 | 8/1997 | Aristides et al. | 348/13 |
| 5,671,267 | 9/1997 | August et al. | 379/61 |
| 5,686,954 | 11/1997 | Yoshinobu et al. | 348/13 |
| 5,689,663 | 11/1997 | Williams | 395/327 |
| 5,710,601 | 1/1998 | Marhsall et al. | 348/564 |
| 5,710,605 | 1/1998 | Nelson | 348/734 |
| 5,721,583 | 2/1998 | Harada et al. | 348/12 |
| 5,758,259 | 5/1998 | Lawler | 455/5.1 |
| 5,761,606 | 6/1998 | Wolzien | 455/6.2 |
| 5,793,438 | 8/1998 | Bedard | 348/569 |
| 5,801,747 | 9/1998 | Bedard | 348/1 |
| 5,850,304 | 12/1998 | Elmers et al. | 359/142 |
| 5,920,642 * | 7/1999 | Merjanian | 382/126 |
| 5,990,803 * | 11/1999 | Park | 340/825.34 |
| 6,070,796 * | 6/2000 | Sirbu | 235/382 |

* cited by examiner

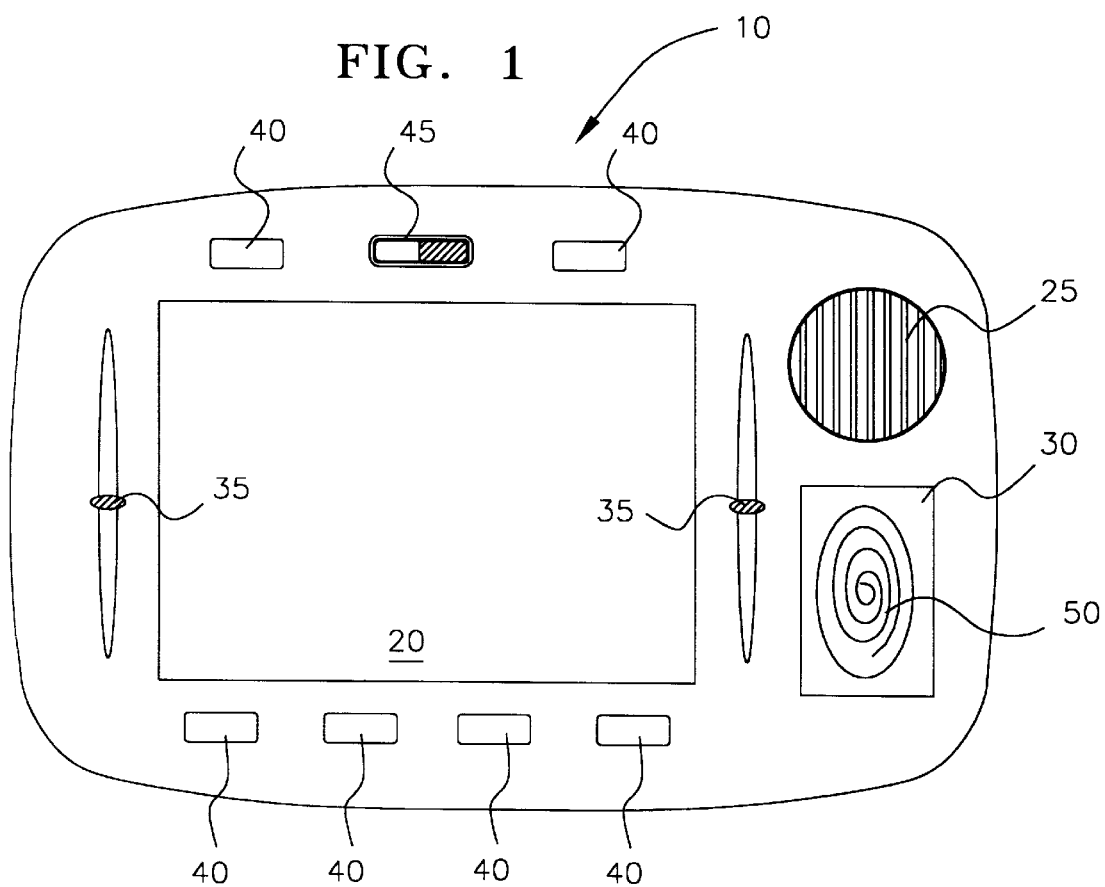

METHODS OF USING A CONTROLLER FOR CONTROLLING MULTI-USER ACCESS TO THE FUNCTIONALITY OF CONSUMER DEVICES

RELATED APPLICATIONS

The present application is related to U.S. patent application Ser. No. 09/001,873, titled "Portable Internet-Enabled Controller And Information Browser For Consumer Devices", (hereinafter referred to as "the '873 application"), filed on Dec. 31, 1997. The present application is also related to U.S. patent application Ser. No. 09/001,841, titled "System For Dual-Display Interaction With Integrated Television And Internet Content", (hereinafter referred to as "the '841 application" ), also filed on Dec. 31, 1997. The present application is also related to U.S. patent application Ser. No. 09/221,940, titled "Method of Data Display For Electronic Program Guides (EPGs), (hereinafter referred to as "the '940 application"), filed on Dec. 28, 1998. The disclosures of all of the above-referenced applications are herein incorporated by reference.

FIELD OF THE INVENTION

The present invention relates generally to multi-user access to consumer devices through use of a controller. More particularly, the present invention relates to methods of using a controller such that a first user may reinstate a prior system state of the controller associated with that user's prior use thereof, by a relatively simple, quick, and secure log-on procedure.

DEFINITIONS

As used in this application, the terms "user", "viewer", and "consumer" are used interchangeably depending on the context, to refer to a person using the methods and devices described herein. A user may be a "logical user". A "logical user" may be a single user, or a group of users having shared or aggregated program preferences. For example, "kids" may be a logical user, for which program preferences are determined by a parent. Or "critics' choice" may be a logical user, for which program preferences are determined by a group of program critics. Or "default" may be a logical user, for which program preferences are determined by a predetermined, programmed, or random algorithm.

Also as used in the application, to "log-on" refers to a procedure by which a user identifies himself to a system or device for the purpose of gaining control thereof, and "log-off" refers to a procedure by which a user's control of a system or device is relinquished, typically in favor of another user.

BACKGROUND

More and more increasingly, controllers of electronics are becoming available that may be programmed such that their interfaces are adapted to suit various individual preferences, thus allowing multiple users to take advantage of the controller's programmable interfaces by customizing the interfaces for their own particular desires. Additionally, these controllers may allow for parental control over children's access to specified functions associated with the controller. The above-referenced '873, '841, and '940 applications describe some such controllers, including hand-held remote controllers with graphical displays, for controlling consumer devices.

To log-on to these multi-user devices, a user typically enters a password. This type of access or log-on has a major drawback in that the password may be easily forgotten. Additionally, access via passwords may be difficult for small children. Other existing identification or log-on technologies, such as fingerprint, voiceprint, or other bio-metric technologies, could overcome these drawbacks, yet they have not heretofore been incorporated into remote controllers for consumers devices such as those described in the above-referenced '873, '841, and '940 applications.

However, even if a user logs on successfully, whether by password, bio-metric identification, or otherwise, the user is typically presented with a display (either on the device, or on an associated device such as a television screen, computer monitor, etc.) representing a common starting point for every user who logs on. This is inefficient for situations in which it is common for the controller to be transferred from one user to another frequently in a short time period. For example, in the context of a controller and browser device to be used by multiple family members, there may at times be frequent changes of users. It would be frustrating for each new user to have to "start from scratch" each time, and navigate from a universal initial system state (or screen, or page, etc.) to the system state of interest.

For example, if a first user mostly uses the controller for controlling a CD library changer, and a second user mostly uses it for television viewing, then it will often be the case that the first thing the users would want to do is look at CD alternatives or EPG data respectively. With the traditional approach to user identification, when the second user wants to use the controller after the first user, and the second user wants his or her own preferences in the user interface, he or she would have to start from the initial screen or system state, and navigate to an EPG screen. And this would be permitted to occur only after the first user was properly logged off of the controller. Similarly, the first user would have to navigate from the initial screen to a CDs screen, after gaining control of the controller from the second user, and only after the second user was logged off.

Systems are known wherein the system may be "locked", either manually or automatically, after some time delay, but only the same user can "log in" to the system again, back to the last system state the machine was in. This is the case, for example, with personal computer operating systems such as Windows95, where a screen saver may require a password for a user to log back on to the system. Systems are also known wherein a "super-user" is defined who can log-in to the system in its current state at anytime. But if the "super-user" customizes the environment for his or her own preferences, those preferences will remain in effect for the original user when the original user logs back into the system. That is, the system will no longer be in the state in which that original user left it, unless the super-user manually restores the original user's last state prior to returning control to the original user. An example of this type of system is a Unix computer workstation.

Another problem associated with current multi-user devices is that time-out algorithms are typically driven solely by a predetermined or programmed time delay. That is, after a certain amount of time of non-activity has passed, the system or device will automatically log-off as a security feature to prevent another user from gaining unauthorized access thereto. This may not be desirable in situations in which it is common for the controller to be in use, yet idle, for extended periods of time. For example, in the context of a controller and browser device to be used by multiple family members, a user may listen to hours of music at a time, or watch a several hour long movie, and would want to retain control of the device despite having not activated any features thereon since starting the music or movie.

To overcome the above-referenced drawbacks in the prior art, it would be desirable to provide a controller in which each user can log-on in a quick and simple yet secure manner, and/or which enables each user to be presented with the controller in a system state the same as or similar to the system state the controller was in the last time the user had control thereof, and/or which provides for time-out algorithms more sophisticated than simple time-triggered algorithms.

SUMMARY OF THE INVENTION

The present invention incorporates bio-metric identification technologies, such as fingerprint identification and/or voiceprint identification, into the field of controllers for consumer devices. The present invention also enables each user of a multi-user controller to be presented upon log-on to the controller a system state the same as or similar to the system state the controller was in the last time the user had control thereof. The present invention also incorporates into the controller operation more sophisticated time-out algorithms than simple time-triggered time-out algorithms.

The bio-metric technologies used for identification may be easily incorporated into existing hardware and/or software applications involving controllers for consumer devices. The controller either stores or has access to data representing the bio-metric identities of each user, and is able to compare this data with bio-metric input streams of users attempting to log-on, to determine the identification of the user. Either fingerprint identification, or voiceprint identification, or both, may be used. Such technologies are relatively secure, and are simple enough for most people, including small children, to operate. In addition, they provide a relatively quick procedure for logging on to the controller.

To present a user upon log-on to the controller, a system state the same as or similar to the system state the controller was in the last time the user had control thereof, the controller stores or has access to data representing each user's previous use state or states, as well as user profile data representing each user's preferences. Such a feature would save time by preventing a first user, upon log-on after temporary use by a second user, from having to re-navigate to a system state that the first user may have been at only minutes earlier. Each user may have more than one user profile, in which case once logged-on, the user could transfer from one profile to another as often as desired.

Algorithms for determining if and when to time-out (e.g., automatically shut down, or automatically log-off a current user), may include factors such as the time of day or night the user logged-in, the present time of day or night, the type of entertainment or other consumer device being controlled, the identification of the user along with that user's profile(s) and/or previous use patterns, and other factors. Such algorithms may be desired as opposed to simple time-triggered algorithms, because the more sophisticated algorithms are more personalized to each user and to the actual purpose for which the controller is being used.

Combining all of the above features into a multi-user controller of consumer devices results in a controller system that adapts to different users very quickly and easily.

Thus, a first aspect of the present invention involves accessing the functionality of consumer devices using a controller having a bio-metric user-identification input component by supplying bio-metric input into the input component. The input component may be a fingerprint input pad and/or a microphone, for example.

Another aspect of the present invention involves controlling multi-user access to functionality of consumer devices using a controller having a bio-metric user-identification input component by supplying bio-metric input of a first user into the input component; providing access to the functionality of consumer devices by use of the controller, said access being dependent upon the bio-metric input of the first user; supplying bio-metric input of a second user into the input component, said bio-metric input of the second user being supplied after said bio-metric input of the first user is supplied; and providing access to the functionality of consumer devices by use of the controller, said access being dependent upon the bio-metric input of the second user.

Another aspect of the present invention involves a controller for controlling access to consumer devices comprising a bio-metric input component, a graphical display, hardware capable of sending infrared (IR) commands, a memory, and a plurality of physical actuating buttons.

Another aspect of the present invention involves a method of controlling multi-user access to functionality of consumer devices by providing a first user access to a first set of functionality of consumer devices by use of a controller, said access being dependent upon an identity of the first user determined by the controller based upon input to the controller from the first user, said controller being in a first state associated with said identity; and said controller switching to a second state after being in the first state, said switch to the second state occurring at a time dependent upon at least the identity of the first user.

Other objects and advantages of the present invention will be apparent from the detailed description which follows, when read in conjunction with the associated drawings.

BRIEF DESCRIPTION OF THE DRAWINGS

FIG. 1 shows a hand-held controller for consumer devices, as an example of a device embodying the concepts of the present invention.

DETAILED DESCRIPTION OF THE INVENTION

The present invention incorporates bio-metric identification technologies, such as fingerprint identification and/or voiceprint identification, into the field of controllers for consumer devices. The present invention also enables each user of a multi-user controller to be presented upon log-on to the controller a system state the same as or similar to the system state the controller was in the last time the user had control thereof. The present invention also incorporates into the controller operation more sophisticated time-out algorithms than simple time-triggered time-out algorithms. these concepts form the basis for quick, simple, and secure methods for multiple users to use a controller, such as a hand-held remote control with a visual display, to control consumer devices such as televisions, CD players, stereos, tape players, computers, etc.

A controller 10 embodying the concepts of the present invention is shown in FIG. 1. This controller is a hand-held remote control with a visual display area 20. The internal electronics of the controller 10 are known in the art, but nonetheless various schematic diagrams for various uses are shown in detail in the '873, '841, and '940 applications. Though the microphone 25 and fingerprint touch pad 30 are not shown in those diagrams, the required hardware therefor is well known in the art and could be easily integrated into the hardware described in those diagrams.

The display area 20 on the controller 10 allows data to be presented to the user. The data may be graphical, text, motion picture, HTML, etc. Various physical actuating buttons, such as sliders 35, push buttons 40, and toggles 45, are on the controller 10 and may be used for various applications as needed. Other buttons such as dials, knobs, pull buttons, a mouse, etc., may exist as well, but are not shown. Buttons may be associated with predefined functions, or they may be programmable. The various types of buttons and their associated uses in cooperation with the display screen 20 are described in greater detail in the '873, '841, and '940 applications.

Turning to the use of bio-metric identification methods, it is to be understood that the present invention may incorporate existing, and/or future bio-metric technologies into the field of controllers of consumer devices, simply by attaching to or integrating with the controller 10, an input component capable of analyzing the bio-metric input data. The examples described herein simply incorporate existing technologies. Standard off-the-shelf hardware and/or software for fingerprint or speaker recognition technology is incorporated into the controller 10. This would require adding an extra fingerprint input pad 30 and/or microphone 25 to the hardware described in the '873, '841, and '940 applications, but these modifications are straightforward to a person skilled in the art of electronics, and the hardware (including the microprocessor) described in the '873, '841, and '940 applications is more than adequate for the computational needs of the user identification technologies.

Using the fingerprint identification technology, a new user may log-on to the system simply by touching the fingerprint identification pad 30. The fingerprint pad 30 may also be a light sensor or other scanning device, as opposed to an actual touch pad 30, and use of the word "pad" herein is intended to encompass these other fingerprint identification technologies as well. A graphic or etching 50 representing a fingerprint may be present on the pad 30 to assist the user in properly orienting his or her finger for identification. Fingerprint recognition may be accomplished by relatively inexpensive hardware, costing approximately $50.00. In addition, some existing artificial retina technologies which, combined with software algorithms for fingerprint recognition, may lead to an especially preferred and relatively inexpensive implementation of the user identification process. See, e.g., U.S. Pat. Nos. 5,220,642, 5,581,094, and 5,694,495, all of which are incorporated herein by reference.

For speaker recognition, the preferable method envisioned herein does not include what is known in the art as "speech recognition" or "natural language processing", because there is likely to be relatively loud environmental noise (e.g., from current TV program or CD audio content), which would make the speech recognition task even more challenging than it is already. Moreover the system's continual monitoring of audio inputs to determine whether a command had been uttered would be draining on both power and computational resources. Thus, for speaker recognition it is preferable to require an additional indication to the system that a new user wishes to log-on. This could be accomplished, for example, by holding down one of the buttons 40 and simultaneously pressing a predetermined button such as an on/off button, or by pressing a single button 40 multiple times rapidly in succession. The system could then prepare for the voice input data by initiating an audio input sequence, and the user would speak their identifying phrase to be logged-on. The system could return to its previous control state after processing the voice data, or after a certain amount of time has passed without receiving any such data. Preparing the system for voice input data in this manner would greatly simplify the problem of filtering out background noise. The occasional identification of a user as one of a relatively small number of known users, on the basis of their unique voice characteristics, is a much less resource-intensive process than the process of constantly monitoring all environmental sounds and attempting to match the sounds to the voice profiles of known users.

Speaker recognition has been used in other applications, such as phone banking, and such subsystems can be easily integrated into existing computer systems such as the controllers described in the '873, '841, and '940 applications. Such technology is available, e.g., from Nuance Communications (Menlo Park, Calif.; www.nuance.com) and Keyware Technologies (Keyware Technologies, Inc. of Woburn Mass., and Keyware Technologies NV of Zaventem, Belgium; www.keywareusa.com).

Other bio-metric technologies may be used as well, such as retina scanning devices, facial recognition technologies, etc. Additionally, any other means of uniquely identifying a user, which does not require any memory or sophisticated tasks to be performed by the user, may be used. For example, recognition of pen-based input such as a signature or user's unique handwriting may be used.

Some bio-metric identification technologies often have the drawback that they are unable to ascertain to a reasonable or acceptable degree of certainty, that an input stream corresponds to a known identity. But this type of problem is usually due to the massive amounts of data known to the controller. In the typical situations described herein, however, since the number of users for a controller of consumer devices will be relatively low, on the order of less than a dozen, the problem of matching an input stream to its associated data known to the controller is mitigated substantially. Thus these technologies are exceptionally suited for incorporation into the field of remote controls for consumer devices.

The bio-metric identification concepts described herein may apply to controllers used as described in the '873, '841, and '940 applications. For example, a significant benefit of these concepts for controllers such as those described in the '873 application is the ease with which users, especially children, can identify themselves and have their interface preferences adopted by the controller 10. They can easily "pick up where they left off" in their use of the controller 10. For controllers used as described in the '841 application, the additional level of security afforded by fingerprint or voice recognition technologies is another added benefit when using the controller for accessing the Internet, such as when conducting e-commerce transactions.

Another concept that may be incorporated into the field of controller technology is the ability to present a user upon log-on to the controller 10, a system state the same as or similar to the system state the controller 10 was in the last time the user had control thereof. To accomplish this, the controller 10 stores or has access to data representing each user's previous use state or states, as well as user profile data representing each user's preferences. The previous use states may comprise data including which screen was last being viewed, what time of day or night the user logged-on or logged-off, the content data that was displayed to the user, selections made by the user, navigation history of the user from the user's last use, etc. It is well within the skill of electronics and programming arts to store and retrieve this type of data, and to reinstate the controller 10 to a state based upon the data retrieved. As for user profiles, the '873, '841, and '940 applications discuss means for recording each user's interactions with the controller 10, and discussed how to use this recorded data for the purposes of parental review of children's viewing, etc. These features may be used either alone, or in combination with the additional user identification methods described herein.

Various algorithms may be used to determine what system state to present to a user upon log-in. The simplest is to merely set the system state to the exact state that the controller 10 was in when the user last used the controller 10, or if the user is a first-time user, then to present an initial system state such as a welcome screen. However, it may not always be desirable to present the exact previous state. For example, assume that at 7.45 p.m. Tuesday a user is checking an EPG grid for TV programs starting in the time period 7:30 pm→9:pm, and the user then logs-out (by switching off the controller 10, executing a log-off procedure, having another user log-in, timing out, etc.). If the user logs-in for the next time on the following day, Wednesday, at 6:45 pm, the system might return to a screen of the current programs, 6:30 pm–8 pm Wednesday.

Conversely, if on Tuesday the user had last been looking at the TV schedules for a future time, such as Wednesday 8:30 pm→10 pm, then when the user logged-in Wednesday at 6:45 pm, it would be reasonable for the system to return the user to the Wednesday 8:30 pm→10 pm EPG grid. In the same scenario, if the user did not log in again between Tuesday and Thursday, the system should not redisplay Wednesday's grid on Thursday, but instead would display Thursday's grid. These are just some examples of algorithms that may be incorporated into the controller's decision-making process of which system state to present to a user upon re-logging-in.

Typical behaviors of users may also play a role in determining which screen is shown first. For example, if a particular user makes 80% of all their interactions with a CD listings screen, the controller 10 could determine this to be the "typical" use, and whenever that user logs in, they could be immediately taken to this screen.

A sample multi-user scenario incorporating the concept of returning a user to a previous system state upon log-in, is as follows. Two family members are deciding whether there is anything on TV that they wish to watch together. The first user (USER-1) has preferences for movies, and likes uncluttered screen displays with large fonts, whereas the second user (USER-2) generally prefers sports programs, and likes lots of information on the screen simultaneously, with small fonts. USER-1 looks at the EPG guide in her preferred format and locates several items that may be of interest to her. She passes the remote to USER-2, who looks at the display as USER-1 had left it, and decides that he would like to consider some other alternatives before making a choice. He presses his index finger to the fingerprint pad 30, and the display switches to a view of the current EPG data that has smaller fonts, and many more sports program listings.

In cases where two or more users frequently use the controller essentially "simultaneously" as in the scenario just described, it may be easier for them to define a "group user", such as "USER1+USER2". The profile may contain preferences for medium fonts, and moderate amounts of both movies and sports in the initial EPG overview grid, etc. Any individual user who is a member of a "group user identity" would be able to make a straightforward change to the user interface preferences of that group identity at any time. This may occur by another simple combination of simultaneous physical button presses, or other input means such as touch screen interaction, etc., or by the user who is currently identified to the controller simply re-identifying himself. It is preferable that for each system state associated with a group-user identity, that there is also data associated therewith to tie the system state to the individual user that is the member of the group and who is associated with the system state. This would allow a user (USER-1, e.g.) to transfer between his individual identity system state and the group identity system state (USER1+USER2) easily. It would also allow the controller 10 to prevent USER-1 from transferring from the USER1+USER2 group identity to the USER-2 individual identity.

Another feature that may be incorporated into the field of controller technology is the use of time-out algorithms which incorporate factors other than merely the passage of a certain amount of time. Typical computer applications offer the simple option of specifying a number of minutes for a time-out, after which the system "locks" and the user has to re-type a password to regain access. However, for the multimedia consumer device controller application, it will be quite normal for a user to interact briefly (e.g. to start a movie), and then have little or no interaction for two hours. More sophisticated time-based time-out algorithms are appropriate. For example, the time-out algorithm may incorporate factors such as the identity or class of the user, the time of day or night, the category of use (e.g., listening to CDs, watching TV, etc.), the category or subject matter of activity within a particular category of use (e.g., movies within TV). When the controller 10 times-out, it is no longer under the control of the previous user. The controller instead may enter into a default state, power-down, or switch to a state representing another user's preferences and/or privileges.

The default state may be desirable, e.g., for guests and other users not known to the controller, to allow them access to basic functionality of the devices being controlled, without sacrificing any desired parental control, security, etc. For example, a default state may prevent access to pay-per-view programming, certain channels, etc., and may prevent use functions associated with conducting e-commerce using pre-authorized credit information, etc. The particular default state criteria may be predetermined or programmable by the primary user, such as a parent.

As a specific example, if a parent is watching TV in the evening, their user id may remain "logged in" until 1 am with little or no interaction, but after that time the system logs out, and automatically changes user preferences for the 6-year old child, who then does not need to do anything to "log in" and see the children's TV selections at 5:30 am. Alternatively, it may be desirable for there to be no time-out process at all for certain users, and instead require a manual log-off. Or there could be a lock feature instead of or in addition to a time-out feature. A lock feature could simply lock the physical buttons and/or display (perhaps invoking a "screen saver", a banner ad program, etc.) and require re-identification of the pre-lock user in order to unlock the display. Another example of a more sophisticated time-out algorithm is that a time-out may occur after a predetermined period has passed during nighttime hours, but not daytime hours.

Systems and methods have thus been described wherein each user may log-on to a multi-user controller of consumer devices in a quick and simple yet secure manner, and/or which enable each user to be presented with the controller in a system state the same as or similar to the system state the controller was in the last time the user had control thereof, and/or which provide for time-out algorithms of the controller that are more sophisticated than simple time-triggered algorithms.

While certain embodiments are illustrated in the drawings and are described herein, it will be apparent to those skilled in the art that modifications can be made to the embodiments without departing from the inventive concepts described. For example, the microphone 25 and/or fingerprint input pad 30 may appear on the front, back, or side of the controller 10, or may be external devices connected to the controller via an input jack or port (not shown) on the controller. Similarly, the database of known users may be stored within the controller 10 itself, or may be stored externally on a separate storage device. In the latter situation, as an added security measure the database may be stored on a device, such as a mini-CD or mini-disk, such that access to the controller 10 requires insertion of the CD or disk into an appropriate reader (either incorporated into, or external to, the controller 10). Accordingly, the invention is not to be restricted except by the claims which follow.

What is claimed is:

1. A method of controlling multi-user access to functionality of consumer devices comprising the steps:

providing a controller having a bio-metric user-identification input component;

providing access to the functionality of consumer devices by use of the controller, said access being dependent upon bio-metric input of a first user entered into the input component; and providing access to the functionality of consumer devices by use of the controller, said access being dependent upon bio-metric input of a second user entered into the input component, said bio-metric input of the second user being entered after said bio-metric input of the first user, wherein said controller is programmed to present the second user upon log-on thereto, a system state substantially similar to a previous system state of the controller that was in effect at the end of a previous use of the controller by the second user.

2. The method as in claim 1, wherein the bio-metric user-identification input component is a fingerprint pad.

3. The method as in claim 2, wherein the controller is a hand-held controller.

4. The method as in claim 3, wherein the controller comprises a display area, and further comprising the step of displaying on the display area data representing available functions to be executed.

5. The method as in claim 1, wherein the bio-metric user-identification input component is a microphone.

6. The method as in claim 5, wherein the controller is a hand-held controller.

7. The method as in claim 6, wherein the controller comprises a display area, and further comprising the step of displaying on the display area data representing available functions to be executed.

8. The method as in claim 1, wherein one of the consumer devices is a television.

9. The method as in claim 1, wherein the controller comprises a display area, and further comprising the steps of:

identifying a first system state of the controller associated with the first user, said first system state being determined based upon a previous use of the controller by the first user;

identifying a second system state of the controller associated with the second user;

displaying on the display area, in response to the bio-metric input of the first user, data representing the first system state; and displaying on the display area, in response to the bio-metric input of the second user, data representing the second system state.

10. The method as in claim 9, further comprising the step of said second system state being determined based upon a previous use of the controller by the second user.

11. The method as in claim 9, further comprising the steps of:

identifying a third system state of the controller associated with a group of which the first user is a member;

displaying on the display area, in response to an action by the first user, data representing the third system state.

* * * * *